May 19, 1942. C. N. ERICKSON 2,283,355
REDUCING VALVE AND FLOW REGULATOR
Filed Nov. 30, 1938
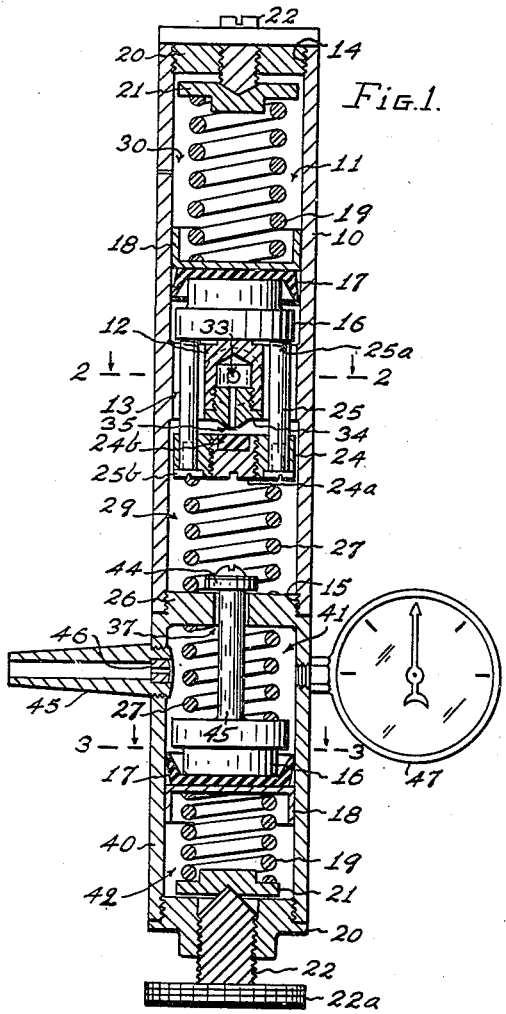
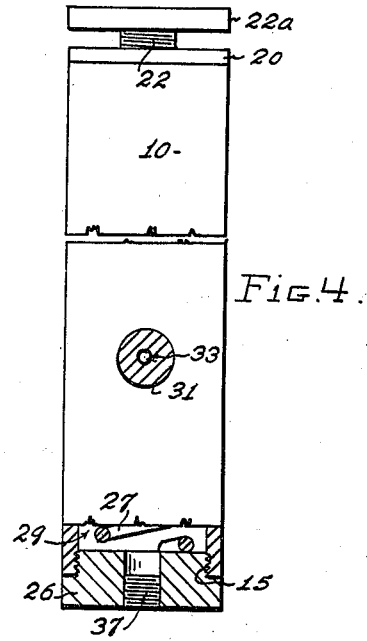
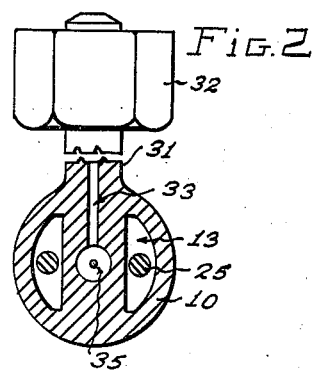
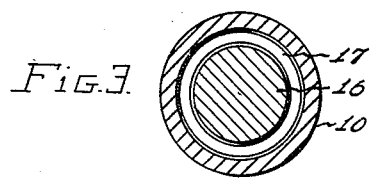
INVENTOR.
Clarence N. Erickson Patented May 19, 1942

2,283,355

UNITED STATES PATENT OFFICE 2,283,355

REDUCING VALVE AND FLOW REGULATOR

Clarence N. Erickson, Glendale, Calif.

Application November 30, 1938, Serial No. 243,155

2 Claims. (Cl. 50—35)

My invention relates to devices for controlling the pressure and flow of fluids, particularly gaseous fluids which are stored at high pressures and required to be delivered at lowered pressure and/or at accurately controlled rate of flow. The invention provides for pressure reduction by stages altho certain salient features of the invention apply to single stage pressure regulators or reducing valves.

The primary object of the invention concerns simplicity of construction to facilitate assembly, inspection and adjustment, and to insure continued accuracy and long life. Many of the gases required to be controlled are of such original density and activity as to promote rapid wear or deterioration of the diaphragms, needle valves and the like found in usual reducing valves and flow regulators. It is an object of this invention to provide an accurate and sensitive device devoid of needle valves and diaphragms and which is peculiarly suited to both high pressure and low pressure conditions.

Another object of the invention is to provide an improved multi-stage reducing valve which in combination with a fixed orifice designed especially for each particular gas, will provide an extremely accurate visibly-indicating flow regulator. Such a device is in demand either singly or in multiple units for anaesthetic equipment, oxywelding equipment, and many and varied industrial chemical processes.

Also in a complete flow regulating device of the indicating type it is an object of the invention to provide an adjustment whereby the delivery of gas can be varied under close regulation to meet varying conditions, and this requires a sensitive device of the kind that does not tend to stick or jamb and is immediately responsive to slight pressure change.

Specifically, it is among the objects of the invention to provide an accurate and compact flow regulator having a gauge calibrated in volumes (such as liters) per unit of time and several of which may be incorporated in a single casting or body to readily provide a complete measuring and mixing device for delivering individually predetermined amounts of a plurality of different gases as in anaesthetic work and other processes where mixtures of predetermined formula are required to be delivered to a single conduit.

Diaphragms are subject to deterioration and are difficult to keep sealed at their edges and must serve as high pressure gaskets between the metal parts in which they are retained, while needle valves require extremely accurate fitting and tend to become distorted or to seize to an extent that pressure fluctuations and flow variations take place, which even momentarily are objectionable in many types of equipment to which this invention is applicable. It will be apparent hereinafter that in devices made possible by this invention the only parts subject to friction are practically self-lubricating and are peculiarly adapted to taking their own wear automatically.

Still other objects and advantages of my invention will appear hereinafter.

I have illustrated my invention by the accompanying drawing in which:

Figure 1 is a detail vertical section of a complete two-stage reducer and flow regulator built according to this invention.

Figure 2 is a cross section thereof seen on line 2—2 of Figure 1.

Figure 3 is a cross section thereof seen on line 3—3 of Figure 1.

Figure 4 is a view mainly in side elevation, but with parts broken away, of a modification in the form of a single stage reducer and flow regulator.

The numeral 10 indicates a body which is provided with an originally open-end bore 11, about midway between the ends of which is provided a transverse web 12. This web does not take up the entire cross-section of the bore and provides slots such as 13 between itself and the walls of the bore. The bore is internally screw threaded at each end as at 14 and 15 respectively. It will now be apparent that this entire body is a simple casting easily machined, or, several of the bores, each with its own web, can readily be provided in a single casting or block (not shown) where a multiple reducer or flow regulator is required. Also the bores may be of relatively small diameter to make a neat and compact unit.

Into one end of the bore is fitted a piston body 16 which normally comes to rest upon the web 12. Over the correspondingly machined end of this piston is fitted a piston cup 17 which is preferably composed of oil-proof rubber and which may be treated with glycerine or other suitably inert lubricant to provide a long-lived, non-congealing lubrication film to make the cup and piston highly sensitive to slight pressure fluctuations. Over this cup is placed a metal spring-cap 18 facing outwardly of the bore and retaining a spring 19 which is compressed between the piston and the corresponding outer end of the bore.

Here the bore is closed, tho in a manner which does not allow pressure to build up therein, by a simple screw plug 20 which is readily removed for inspection. Between the spring 19 and the plug 20 there is provided a spring seat 21 at the outer end of the spring and which is adjustably movable by an adjusting screw 22 which is threaded thru the plug 20 to abut the seat 21. This screw is here shown as having relatively slight adjustment and of a type which is not quickly adjusted, since this adjustment is used only occasionally in a two stage unit.

It will be seen that the piston cup 17 is held in place mainly by the compression of the spring and requires no perforations or fastening devices which might give rise to leakage, or waste of expensive gases.

In the other end of the bore is inserted a valve disc, generally indicated by the numeral 24. This disc includes an adjustable screw-threaded insert 24a which in turn includes a central composition insert 24b. This valve disc is to be positively moved in both directions axially of the bore by the piston body 16 and is accordingly secured thereto. Since the valve disc 24 is at the opposite side of the web 12, from the piston body 16, they are attached by means of one or more studs 25 each of which passes thru a corresponding slot 13 and has an end screw threaded as at 25a into the piston body. The studs are in turn held to the valve disc by machine screws 25b. The corresponding end of the bore is closed by a second screw plug 26, and between plug 26 and valve seat 24 there is compressed a lighter spring 27.

The construction and arrangement of parts just described is such that the parts are easily assembled thru the open ends of the bore in keeping with objects of the invention. The opposed differential springs serve to keep the independent piston cup 17 compressed in place at all times altho the edges of the cup are free to expand and form a gas tight piston of low friction co-efficient. This piston divides the bore into chambers 29 and 30 respectively, the chamber 29 inwardly of the piston being known as the higher pressure chamber and the chamber 30 outwardly of the piston being known as the atmospheric-pressure chamber.

The body includes a projecting boss 31 having a nut 32 or other such device for attachment to a high pressure bottle or gas line (not shown) and this boss is alined with web 12 and a gas passage 33 is drilled thru the boss and web into the center of the web. In the innerside of the web adjacent the properly adjusted valve disc insert 24b, there is screw-threaded a spud 34 having a small diameter high-pressure inlet port 35 which communicates with the gas passage 33. The insert 24b is adjusted quite close to the port 35 so that very slight upward movement of the valve disc and piston will close the port. The insert 24b is sufficiently resilient to take up wear and to effectually seal this small diameter port.

The opposed springs in addition to holding the parts in assembly and primary adjustment keep the valve disc and attached parts in a critically balanced condition where the gas pressure in chamber 29 and acting against the piston is sufficient to overcome the preponderance of pressure provided by the stronger spring 19. Such balancing of the valve disc and piston during operation insures very sensitive response to pressure variations. With the parts in the position shown gas entering via the spud port 35 builds up in pressure until that pressure acting on the piston against spring 19 offsets the preponderance of thrust created by the stronger spring 19, whereupon the piston moves up, or actually is moved up by the lighter spring 27 to close the port 35. From this point on a minute pressure reduction in chamber 29 allows the stronger spring 19 to move the piston and valve disc down to unseat the valve disc from the port, and in this way the sensitively balanced springs will cooperate to keep the chamber 29 filled to just that pressure predetermined by the original setting of the spring as determined by the adjusting screw 22.

In Figure 4 I have shown all the parts just described as forming a complete single stage pressure regulator. In this modification, as in the complete device shown in Figures 1 to 3 inclusive, the lower screw plug 26 is provided with an outlet port 37, to which in the modification shown in Figure 4 there may be attached any suitable outlet fitting (not shown) and in the modification the adjusting screw 22 is fitted with a large readily moved knurled head 22a so that the single stage unit is quickly adjusted.

While the modification shown in Figure 4 makes an ideal reducer for reducing from high pressure to a moderate pressure, the device shown in Figures 1 to 3 inclusive is further equipped to serve as a two stage reducer. Accordingly in Figure 1 the lower screw plug 26 is continued in the form of a low pressure body 40 having a bore forming respectively a low pressure chamber 41 and a second atmospheric-pressure chamber 42 divided by a second piston body 16 and piston cup 17. This piston body and its cup are balanced between two opposed springs also indicated by the numerals 19 and 27 respectively, since the springs, the piston, and its cup are identical with those previously described and function the same except that the springs are adjusted or designed for lower pressure differentials.

Upon screw plug 26 and over its port 37 there is provided a low pressure valve disc 44 which is disposed within chamber 29 of the high pressure reducing unit and which is connected to the corresponding piston body by a valve stem 45 which is practically an integral part of the corresponding piston. Normally the strong spring 19 keeps the valve disc 44 unseated but as pressure builds up in chamber 41 and acts against the piston the strong spring is overcome and the weaker spring 27 becomes effective to move the piston to seat the valve. The actual pressure at which the valve disc 44 will tend to seat is predetermined by adjusting the corresponding adjusting screw and in this way a predetermined pressure is maintained in chamber 41.

Connected to deliver gas from chamber 41 to any suitable device or apparatus (not shown) there is provided the hose fitting 45 which is tapped into the wall of chamber 41. This is fitted with an orifice plate 46 which has been carefully formed so that with a given pressure in chamber 41 it will deliver a known amount of gas. Also there is provided a pressure gauge 47 tapped into the wall of chamber 41 to register the pressure against the orifice.

The complete device, which may for example, reduce from 1000 pounds per square inch to 100 pounds in one stage, and then from 100 pounds to 10 pounds in the second stage, is so sensitive and accurate that by calibrating the gauge 47 in volumetric units such as liters, the exact delivery in terms of unit volumes per unit of time can be controlled solely thru the low pressure adjusting screw and is at all times indicated by the gauge. Thus I provide a pressure reducer and indicating flow regulator in keeping with the objects of the invention.

In using the piston cups, especially of oil-proof rubber I find that they function very sensitively when they are small enough that they barely touch the surfaces of the corresponding chamber at their edges only, so that under pressure variations they contract and expand to keep themselves freed and well lubricated, and I also find that for each type of gas used there is an oil or oily substance, inert to the particular gas and to which the rubber is inert, and which provides a long lived lubricating film. Also it will be found that with multi-stage reduction in devices such as illustrated radiation surfaces are such that appreciable refrigeration is not manifest, while at the valves the circular ports closed or controlled by flat disc surfaces are peculiarly efficient where a high degree of expansion must take place, and that such flat disc surfaces, particularly when of a suitable composition are not subject to wiredrawing in the manner common to metal needle valves and their seats.

I claim:

1. In a device of the class described, a tubular body originally open at both ends and providing a uniform-diameter bore opening at each end thereof; said body further providing a transverse web dividing said bore into an outer chamber and an inner chamber respectively and providing with said body a high pressure inlet orifice opening coaxially of said web into said inner chamber, a piston body freely reciprocable in said outer chamber having respectively, an inner end normally abutting said web to limit inward movement of the piston and a flat outer end, a flexible cup inverted over said piston body having respectively an imperforate central portion contiguous to the outer end of said piston body and an integral annular lip freely slidable on the corresponding margins of the said bore while cooperating therewith to prevent flow of gas toward the outer chamber, a reciprocable guide in said outer chamber of corresponding cross section to be a close working fit therein and acting to hold said flexible cup firmly contiguous to the outer end of said piston body, a removable closure at the originally open end of said outer chamber, a spring in said outer chamber compressed between said closure and said guide, a valve disc in said inner chamber movable axially to close said inlet orifice, rigid means removably interconnecting said valve disc and piston body for simultaneous movement, a removable closure for the open end of said inner chamber, and a spring of lesser strength than the first named spring compressed between said last named closure and said disc, said closures, springs, guide, cup, piston body and valve disc respectively being totally detached from one another and from the body, with the exception of the said means interconnecting the piston body and the valve disc; said interconnecting means including removable screws accessible through the corresponding end of said bore when the second named closure is removed.

2. In a device of the class described, a tubular body originally open at both ends and providing a uniform-diameter bore opening at each end thereof; said body further providing a transverse web dividing said bore into an outer chamber and an inner chamber respectively and providing with said body a high pressure inlet orifice open coaxially of said web into said inner chamber, a piston body freely reciprocable in said outer chamber having respectively, an inner end normally abutting said web to limit inward movement of the piston and a flat outer end, a flexible cup inverted over said piston body having respectively an imperforate central portion contiguous to the outer end of said piston body and an integral annular lip freely slidable on the corresponding margins of the said bore while cooperating therewith to prevent flow of gas toward the outer chamber, a reciprocable guide in said outer chamber of corresponding cross section to be a close working fit therein and acting to hold said flexible cup firmly contiguous to the outer end of said piston body, a removable closure at the originally open end of said outer chamber, a spring in said outer chamber compressed between said closure and said guide, a valve disc in said inner chamber movable axially to close said inlet orifice, rigid means removably interconnecting said valve disc and piston body for simultaneous movement, a removable closure for the open end of said inner chamber, a spring of lesser strength than the first named spring compressed between said last named closure and said disc, a second tubular body integral with the second named closure and providing a coextensive uniform-diameter bore alined with the first named bore; there being a port provided through said second named closure leading into the last named bore, a removable closure at the other end of said last named bore, a valve disc in the aforesaid inner chamber seating over said last named port, a valve stem fixed to said last named valve disc passing through the last named port into the last named bore, a screw removably connecting said last named disc to said valve stem accessible upon removal of said second named closure from the first named body, a second piston body freely reciprocable in said last named bore and fixed to said valve stem, a second flexible cup freely reciprocable in said last named bore having an imperforate central portion abutting said piston body and an annular lip in sliding contact with the margins of the corresponding bore while preventing flow of gas toward the last named closure, a freely reciprocable guide in the last named bore of corresponding cross section to be a close working fit therein and serving to hold said cup compressed against said piston, a third spring compressed between said second named closure and said second named piston body, and a fourth spring compressed between said second named guide and said last named closure, and means in said first named closure and said third named closure respectively, for adjusting the compression of the corresponding springs.

CLARENCE N. ERICKSON.